UNITED STATES PATENT OFFICE.

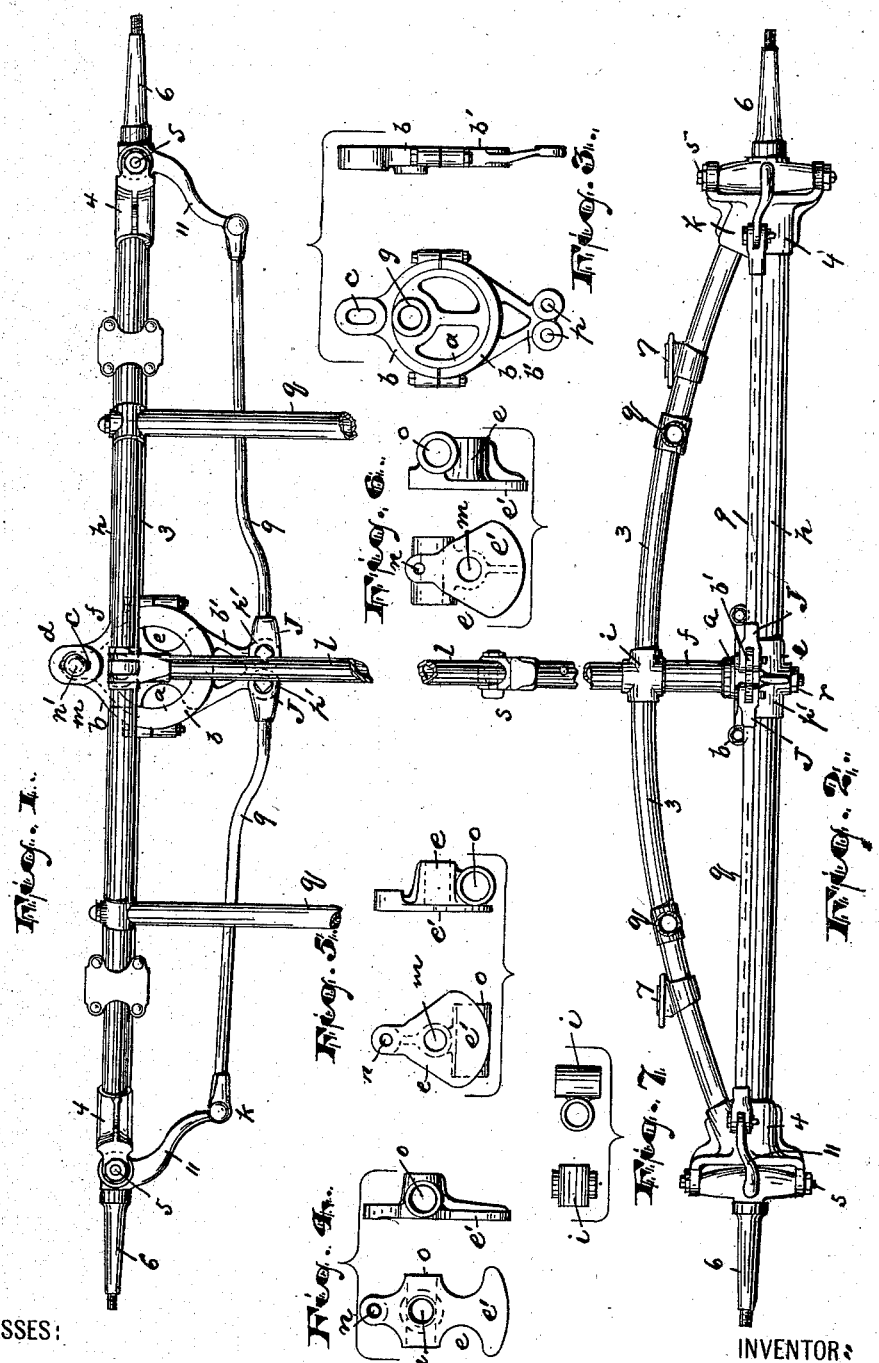

WINTHROP L. MEAD, OF SOUTH ORANGE, NEW JERSEY.

STEERING DEVICE FOR AUTOMOBILES OR OTHER VEHICLES.

SPECIFICATION forming part of Letters Patent No. 714,501, dated November 25, 1902.

Application filed January 24, 1902. Serial No. 91,041. (No model.)

*To all whom it may concern:*

Be it known that I, WINTHROP L. MEAD, a citizen of the United States, residing at South Orange, in the county of Essex and State of New Jersey, have invented certain new and useful Improvements in Steering Devices for Automobiles or other Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to provide simple, effective, and positive means for controlling the direction of movements of automotive vehicles and to reduce or to a large extent avoid the unpleasant vibrations which are usually communicated directly to the steering-handle, and thus render the steering operations more or less unpleasant, and to secure other advantages and results, some of which may be referred to hereinafter in connection with the description of the working parts.

The invention consists in the improved steering device for automobiles and other vehicles and in the arrangements and combinations of parts of the same, all substantially as will be hereinafter set forth, and finally embraced in the clauses of the claim.

Referring to the accompanying drawings, in which like letters and figures of reference indicate corresponding parts in each of the several figures, Figure 1 is a plan, and Fig. 2 is a rear elevation, of the forward framework and steering apparatus of an automobile or other vehicle. Fig. 3 is a plan and side view of a certain eccentric and its lever-like strap. Figs. 4 to 7 are detail views of modified forms of seats or bearings for the said eccentric and strap and which last figures will be more fully described hereinafter. Said Figs. 3 to 7 each illustrate the respective parts both in plan and elevation.

In said drawings, $h$ and 3 indicate bars adapted to extend from side to side of the body of the vehicle, the bar 3 being curved so as to lie close to the bar $h$ at its opposite ends and at the center of the vehicle to lie a little distance above the said bar $h$, the said bars $h$ and 3 being coupled or connected at their opposite extremities by end connections 4 4, which latter provide pivotal bearings 5 5 for the axles 6 6, upon which the running-wheels (not shown) are arranged in any suitable manner. The frame 3, $h$, and 4 serves as one of the supports for the body of the vehicle in any proper manner, the said body or the springs thereof being seated upon chairs 7 7, formed on or attached to the bar 3.

At the centers of the bars $h$ and 3 are arranged or secured bearing-pieces $e$ and $i$ for the steering apparatus hereinafter described. The bearing-piece $i$ in some cases where the steering-bar $f$ is vertically in line with the bar 3 consists of a cross-coupling, as shown in Fig. 2. When the said bar $f$ is arranged a little forward of or a little at the rear of the said bar 3, then a bearing-piece, such as is illustrated in Fig. 7, may be employed. In vertical line with the bearing-piece $i$ on or of the bar $h$ is the bearing-piece $e$. The said piece $e$ serves as a connection for sections of said bar $h$ and as a bearing for the steering-rod $f$. The said piece $e$ provides at its upper side a seat $e'$, upon which an eccentric $a$ and an eccentric-strap $b$ are seated, the said piece $e$ being provided with a hole or passage $m$ for the steering-shaft $f$ and with a hole $n$ for a fulcrumal bolt $n'$.

I have shown in Figs. 3, 4, and 6 three varieties of the piece $e$, the variety shown in Fig. 4 serving when the rod $f$ is in vertical line with the bar $h$, the variety of Fig. 5 being employed when the bar $h$ lies a little behind the bar $f$, and the variety of Fig. 6 showing the piece when the bar $h$ is in front of the bar $m$, the passage $o$ of the piece $e$ being adapted to receive the said bar $h$, which may be and when used with the piece shown in Fig. 4 preferably is in sections.

The piece $e$ is brazed or otherwise rigidly secured upon the bar $h$, so that it cannot turn thereon. Upon the piece $e$ is arranged the eccentric $a$, fastened rigidly and securely upon the bar or rod $f$. Around said eccentric is arranged the eccentric-strap $b$, which is a lever fulcrumed upon the bolt $n'$, secured in the hole $n$ of the piece $e$, the said eccentric-strap being slotted, as at $c$, where it receives the said bolt to prevent binding when the eccentric is turned with the rod or bar $f$. At the rear end the strap or lever $b$ is extended, as at $b'$, the extension being perforated, as at $p\ p$, to receive pivots $p'\ p'$ for connecting-rods 9, having at their opposite ends forgings J, providing pivotal perforations for the said bolts $p'$, by which they may be loosely connected to the eccentric-straps. The said rods 9 connect with the arms 11 of the pivotal axles. Said parts are so arranged as to cause a turning of the axles on their bolts or pivots 5 when the rod $f$, the eccentric $a$, and eccentric-strap $b$ are turned on their bearings. To effect the turning of said rod $f$ with convenience, I have provided the same at its upper end with a handle 1, which is bolted at the extremity of the said rod or bar $f$, so that said handle may be raised to permit the motorman to conveniently pass to or from his seat, but maintain such a relation to said bar $f$ as that the two will normally turn together.

Having thus described the invention, what I claim as new is—

1. The combination with the frame of a vehicle providing pivoted axles and a bearing-plate therebetween having a hole or passage for the steering-rod and a fulcrum for an eccentric-strap, of said steering-rod and means for turning the same, an eccentric seated on said bearing-plate and adapted to be turned by said steering-rod and a lever-like eccentric-strap also seated on said bearing-plate and slotted at its fulcrum and having an arm or extension $b'$, and rods connecting with said extension and with said axles, substantially as set forth.

2. The combination with the frame of the vehicle having a rod $h$, with pivoted axles at opposite ends and a bearing-plate rigidly fixed intermediate thereof, said plate providing a seat, a bearing for the steering-rod and a fulcrum, a steering-rod engaging said bearing-plate at its lower end and at its upper end a handle, an eccentric on said steering-rod and an eccentric-strap fulcrumed on said plate and arranged around said eccentric and having an arm to which the pivoted axles are connected, substantially as set forth.

3. The combination with the steering rod or bar having an eccentric thereon, of a frame having a flat bearing with a fulcrumal slot $c$, and a bearing for said steering-rod and a lever-like eccentric-strap arranged around said eccentric a fulcrumal bolt arranged in said slot $c$, pivoted axles at the opposite ends of said frame and connecting-rods joining the free end of the lever-like strap to said pivotal axles, substantially as set forth.

In testimony that I claim the foregoing I have hereunto set my hand this 20th day of January, 1902.

WINTHROP L. MEAD.

Witnesses:
CHARLES H. PELL,
C. B. PITNEY.